United States Patent [19]

Dunn

[11] 4,197,171

[45] * Apr. 8, 1980

[54] SOLID ELECTROLYTE MATERIAL COMPOSITE BODY, AND METHOD OF BONDING

[75] Inventor: Bruce S. Dunn, Schenectady, N.Y.

[73] Assignee: General Electric Company, Schenectady, N.Y.

[*] Notice: The portion of the term of this patent subsequent to Aug. 22, 1995, has been disclaimed.

[21] Appl. No.: 954,195

[22] Filed: Oct. 24, 1978

Related U.S. Application Data

[63] Continuation-in-part of Ser. No. 807,377, Jun. 17, 1977, abandoned.

[51] Int. Cl.$^2$ ............ C25D 5/00; H01M 6/18; B32B 9/04
[52] U.S. Cl. ................... 204/16; 156/275; 427/383.9; 428/137; 428/539; 428/469; 429/30; 429/193; 429/33
[58] Field of Search ............ 204/14 N, 15, 16; 429/104, 171, 174, 30–33, 193, 185; 428/539, 131, 137; 427/383 D; 156/272, 275

[56] References Cited

U.S. PATENT DOCUMENTS

| | | | |
|---|---|---|---|
| 3,397,278 | 8/1968 | Pomerantz | 204/15 |
| 3,417,459 | 12/1968 | Pomerantz et al. | 29/472.9 |
| 3,901,733 | 8/1975 | Toy et al. | 136/153 |
| 3,946,751 | 3/1976 | Breiter et al. | 429/104 X |
| 3,960,596 | 6/1976 | Mitoff et al. | 429/185 |
| 3,985,576 | 10/1976 | Lingscheit et al. | 429/174 X |
| 4,049,856 | 9/1977 | Adams | 428/131 |
| 4,109,063 | 8/1978 | Dunn | 428/469 X |
| 4,142,946 | 3/1979 | Dunn | 156/275 X |

OTHER PUBLICATIONS

Y Yao et al., "Ion Exchange Properties of and Rates of Ionic Diffusion in Beta-Alumina," Journal of Inorg. Nuclear Chem., vol. 29, pp. 2453–2475, 1967.

*Primary Examiner*—George F. Lesmes
*Assistant Examiner*—Alexander S. Thomas
*Attorney, Agent, or Firm*—Paul R. Webb, II; James C. Davis, Jr.

[57] ABSTRACT

A solid electrolyte material composite body is described which comprises an ion-conductive electrolyte portion selected from a specific class and an ion-insulating surface portion of a divalent ion substituted beta-alumina, and both portions having the same mechanical and physical properties. A method of forming such a body and a method of bonding the body to a metallic element are also described.

5 Claims, 3 Drawing Figures

SOLID ELECTROLYTE MATERIAL COMPOSITE BODY, AND METHOD OF BONDING

This application is a continuation-in-part application of copending application Ser. No. 807,377 filed June 17, 1977, now abandoned. The copending application is assigned to the same assignee as the present application.

The present invention relates to a solid electrolyte material composite body, a method of forming the composite body, and a method of bonding the composite body to a metallic element, and is more particularly concerned with an improved solid electrolyte material composite body with an ion-conductive electrolyte portion selected from a specific class, and an ion-insulating surface portion of a divalent ion substituted beta-alumina, an improved method of forming the composite body, and an improved method of bonding the composite body to a metallic element.

Reference is made to copending patent application Ser. No. 807,406 filed June 17, 1977, and entitled "Composite Body", now U.S. Pat. No. 4,109,063, which describes a composite body which can be made in accordance with the method of the present invention.

Reference is made to copending patent application Ser. No. 807,407, filed June 17, 1977, and entitled "A Method of Bonding a Metallic Element to a Solid Ion-Conductive Electrolyte Material Element", now U.S Pat. No. 4,142,946, which describes a method which can be employed to form the "Composite Body" of copending application Ser. No. 807,406. Both the above patent and patent application are assigned to the same assignee as the present application.

In U.S. Pat. No. 3,397,278—Pomerantz, entitled "Anodic Bonding" and U.S. Pat. No. 3,417,759—Pomerantz, et al, entitled "Bonding Electrically Conductive Metals To Insulators" there are described methods for bonding electrically conducting metals to insulators. The methods include placing the metal and insulator to be bonded in close surface contact, heating the insulator element, thus rendering it electrically conductive, applying a voltage across the elements and passing a low electrical current through the composite for a short time. The insulator element is heated by a conductive platen to provide sufficient electrical conductivity during the application of the voltage to effect the bonding of the conductive element to the insulator.

In "Ion Exchange Properties of and Rates of Ionic Diffusion in Beta-Alumina" by Y. Yao et al, "Journal of Inorganic Nuclear Chemistry", Volume 29, pages 2453–2475, 1967, there is described that the sodium ion in beta-alumina powders and crystals have been exchanged in molten salts with a number of univalent and divalent ions.

My present invention is directed to a solid electrolyte material composite body and to a method of forming such a composite body with ion-conductive electrolyte portion selected from a specific class and an ion-insulating surface portion as opposed to the above Y. Yao, et al article which describes only exchange of the sodium ion in beta-alumina powders and crystals in molten salts with a number of univalent and divalent ions. My invention is directed further to a method of bonding such a composite body to a metallic element as opposed to the articles formed by the methods in the above two referenced Pomerantz patents.

The primary object of my invention is to provide a solid electrolyte material composite body which is useful as a flange or header in a sodium-sulfur battery. Such a sodium-sulfur battery is described, for example, in U.S. Pat. No. 3,960,596—Mitoff, et al, entitled "Battery Casing and Hermetically Sealed Sodium-Sulfur Battery." This patent is assigned to the same assignee as the present application.

In accordance with one aspect of my invention, a solid electrolyte material composite body comprises an ion-conductive electrolyte portion selected from a specific class, an ion-insulating surface portion of a divalent ion substituted beta-alumina, and both portions having the same mechanical and physical properties.

These and various other objects, features, and advantages of the invention will be better understood from the following description taken in connection with the accompanying drawing in which.

Figure 1:
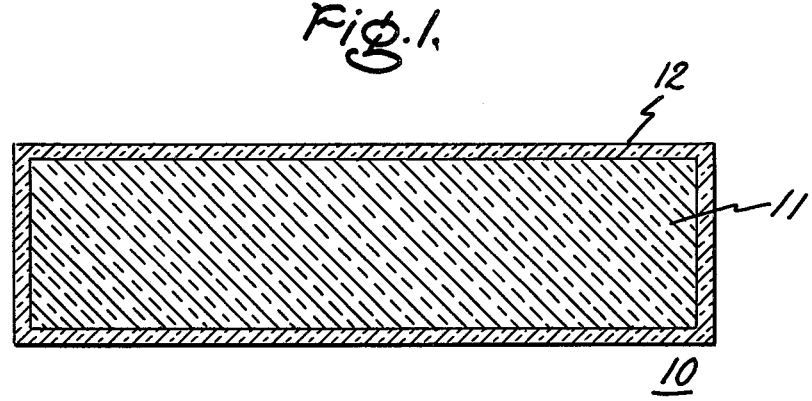
FIG. 1 is a sectional view of a composite body made in accordance with my invention.

In FIG. 1 of the drawing, there is shown generally at 10 a solid electrolyte material composite body made in accordance with my invention. Composite body 10 has an ion-conductive electrolyte portion 11 of sodium beta-alumina. An ion-insulating surface portion 12 of a strontium substituted beta-alumina surrounds electrolyte portion 11. Both portions 11 and 12 have the same mechanical and physical properties.

Figure 2:
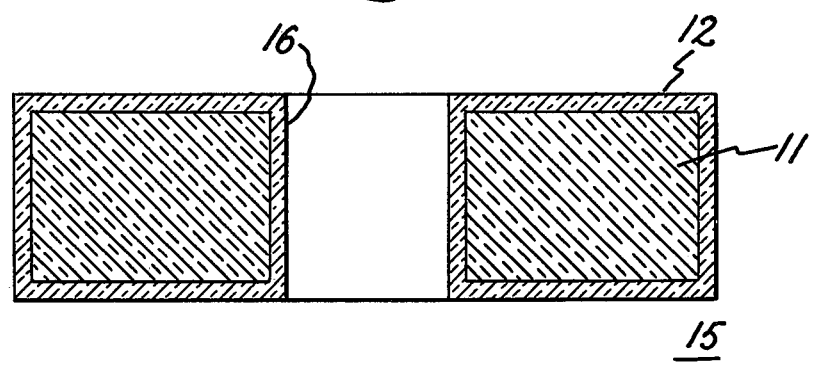
FIG. 2 is a sectional view of a modified composite body.

In FIG. 2 of the drawing, there is shown generally at 15 a solid electrolyte material composite body made in accordance with my invention. Composite body 15 has a central aperture 16 therethrough. Composite body 15 has an ion-conductive electrolyte portion 11 of sodium beta-alumina. An ion-insulating surface portion 12 of strontium substituted beta-alumina surrounds the electrolyte portion 11. Both portions 11 and 12 have the same mechanical and physical properties.

Figure 3:
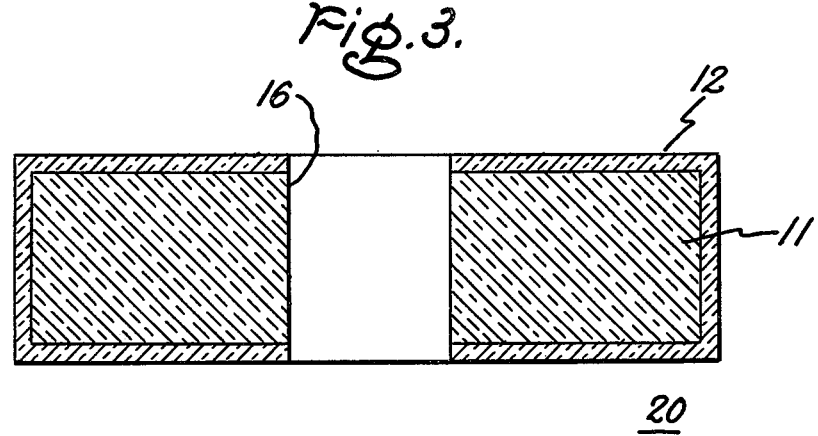
FIG. 3 is a sectional view of a further modified composite body.

In FIG. 3 of the drawing, there is shown generally at 20 a solid electrolyte material composite body made in accordance with my invention. Composite body 20 has a central aperture 16 therethrough. Composite body 20 has an ion-conductive electrolyte portion 11 of sodium beta-alumina. An ion-insulating surface portion 12 of a strontium substituted beta-alumina surrounds the electrolyte portion 11 except for the wall of aperture 16. Both portions 11 and 12 have the same mechanical and physical properties. The wall of aperture 16 does not have ion-insulating portion 12 thereon since aperture 16 is machined after composite body 20 is formed.

Generally, the use of a solid ion-conductive electrolyte material is based upon its excellent ionic conductivity. For use as a flange or header in a sodium-sulfur battery, it is desirable to increase the resistivity of the surface portion of the electrolyte material without altering its mechanical or physical properties.

I found that I could form a solid electrolyte material composite body which comprises an ion-conductive electrolyte portion selected from a specific class, an ion-insulating surface portion, and both portions having the same mechanical and physical properties. Such a composite body can be provided with at least one aperture therethrough. Such a composite body is desirable as a flange or header in a sodium-sulfur battery. Such a composite body is sodium resistant and has a coefficient of thermal expansion similar to the ion-conductive electrolyte material thus eliminating mechanical stresses arising from a thermal expansion mismatch with the ion-conductive tube employed in a battery, such as a sodium-sulfur battery.

I found that the ion-conducting electrolyte portion is selected from the class consisting of sodium beta-alumina, sodium beta"-alumina, potassium beta-alumina, potassium beta"-alumina, lithium beta-alumina, lithium beta"-alumina, hydronium beta-alumina, and hydronium beta"-alumina.

I found that an ion-insulating surface portion material can be formed on the ion-conductive portion to form the composite body of my invention. The ion-insulating portion has a divalent ion substituted beta-alumina. Such divalent ions include calcium, magnesium, strontium and barium which are substituted for two sodium ions. I found further that both portions of the composite body have the same mechanical and physical properties.

I found that my method would form a solid electrolyte composite body which has an ion-conductive electrolyte portion, an ion-insulating surface portion, and both portions having the same mechanical and physical properties. My method comprises providing an ion-conductive electrolyte material element, such as, sodium beta-alumina, submerging the element in a molten salt bath of a salt containing a divalent substitution ion, such as, a strontium++ ion, and converting a surface portion of the element to an ion-insulating material, such as, a strontium substituted ion beta-alumina thereby providing a composite body.

The ion-conductive electrolyte material element in my method is selected from the class consistng of sodium beta-alumina, sodium beta"-alumina, potassium beta-alumina, potassium beta"-alumina, lithium beta-alumina, lithium beta"-alumina, hydronium beta-alumina, and hydronium beta"-alumina. I found that the ion-insulating surface portion of the element can be formed by an ion exchange process wherein a divalent ion, for example, of calcium magnesium, strontium or barium is substituted for two sodium ions. This exchange is accomplished by immersing or submerging the ion-conductive electrolyte material in a molten bath which contains the desired ions in the form of the nitrates, chlorides, iodides, etc. of calcium, magnesium, strontium, or barium. The depth of penetration of the divalent ion is dependent upon the nature of the ion, the composition of the salt bath, and the temperature and time conditions of the process or treatment.

Quantitative results are obtained by measuring the change in sample weight as a function of time and temperature. Preliminary results in a semilogarithmic plot enables one to calculate an activation energy for ion motion. The large values indicate the insulating nature of the surface portion. A simple ratio of these activation energies with that of $Na^+$ (4 kcal/mole) implies that the resistivities for the $Ca^{2+}$ and $Sr^{2+}$ surfaces are greater than that of beta-alumina by factors of $10^3$ and $10^5$ respectively. The total resistance of the exchanged beta-alumina material will depend upon the divalent ion thickness layer and the sample dimensions overall.

The following Table I shows specific conditions of my method of forming a solid electrolyte material composite body.

TABLE I

| Exchange Ion | Bath Composition | Temperature |
|---|---|---|
| 1.) $Sr^{2+}$ | 3 . $Sr(NO_3)_2$ . $NaNO_3$ | 600° C. |
| 2.) $Ca^{2+}$ | $Ca(NO_3)_2$ . $NaNO_3$ | 500° C. |

TABLE I-continued

| Time | Penetration Depth of Exchange Ion (calculated) |
|---|---|
| 1.) 1 hour | $70 \times 10^{-4}$ cm. |
| 2.) 1 hour | $160 \times 10^{-4}$ cm. |

Once the surface portion is altered, the high activation energy for ion motion ensures that this portion will remain stable even when subjected to molten sodium at 300° C. for prolonged periods. The resistive surface portion will prevent any self-discharge of the cell in areas exposed to the atmosphere.

I found that I could bond a metallic element to the ion-insulating surface portion of the composite body of my invention. Such a metallic element must be moderately deformable. My method comprises juxtaposing the major surfaces of the metal element and the composite body in close surface contact relationship, applying an electric potential across the juxtaposed elements to pass a finite current of low amperage through the juxtaposed elements to effect bonding between the juxtaposed surfaces. My method includes bonding one major surface of the composite body to a deformable metallic element. A portion of one major surface of the composite body can also be bonded to the deformable metallic element. Additionally, both major surfaces or a portion of both major surfaces of the composite body can be bonded to deformable metallic elements. Further, one major surface of the composite body can be bonded to a deformable metallic element while a portion of the other major surface of the composite body can be bonded to a second deformable metallic element.

A variety of materials can be employed for the metallic elements. Such materials include various types of steels, aluminum, aluminum alloys, copper, copper alloys, silver, silver alloys, noble metals, molybdenum and silicon. The only requirement is that the metal must be moderately deformable.

My method of bonding is described below for forming a flange with outer metallic casings sealed thereto for use in a sodium-sulfur battery. A composite body as described above is employed which has a single aperture through its center thus providing a flange or ring configuration. A pair of moderately deformable metallic elements of aluminum are provided which are in the form of casings having opposite open ends and a flange portion at one end of each casing. The flange portions of the casings are positioned against opposite major surfaces of the composite body. Each aluminum casing provides an anode, while graphite paint applied to the same major surface of the composite body provides a cathode. A power source in the form of a battery has its negative lead attached to the cathode, while its positive lead is attached to the anode. Such a power source with its associated leads is provided for opposite surfaces of the composite body. An electric potential is applied across each aluminum casing and the composite body from the power source. An electric potential can be applied from both power sources at the same time to thereby pass a finite current of low amperage through the adjacent metallic elements and the composite body. The potential is applied at ambient or elevated temperatures. Effective bonding between the metallic casings and the composite body can be accomplished by applying a current density of from 0.5 to 2.0 milliamperes per $cm^2$ for a period of time from 0.5 to 2 hours. If desired, each metallic casing can be bonded to the composite body separately. The application of the potential across the metallic elements and the composite body effects bonding between the respective flanges and the composite body. It will, of course, be appreciated that only one aluminum casing might be bonded to one major surface of the composite body.

My method includes also bonding one or both major surfaces of the composite body with a deformable metallic element such as aluminum foil. The foil is placed adjacent one or both surfaces of a composite body with a center aperture. The aluminum foil provides the anode, while a cathode is provided by graphite conductive paint applied to the sodium beta-alumina. A power source, such as a battery, with appropriate leads to the aluminum foil and to the cathode is employed to provide the electric potential across the aluminum foil or foils and the composite body.

My method includes further bonding a deformable metallic element such as aluminum foil to one surface of a composite body containing an aperture therethrough while the other surface of the composite body is bonded to a metallic casing of aluminum. The same type of power source and circuit is employed in this variation of my method. In the manufacture of batteries, the metallic casings or containers are brazed or welded to the respective foils.

Examples of methods of forming composite bodies, composite bodies, and methods of bonding a metallic element to a composite body, which are in accordance with my invention are set forth:

EXAMPLE I

A solid ion-conductive electrolyte material cylinder of sodium beta-alumina was provided. A bath composition of $3 \cdot Sr(NO_3)_2 \cdot NaNO_3$ was in molten condition at a temperature of 600° C. The molten bath contained a divalent substitution ion of $Sr^{2+}$ which ion was to be exchanged into the surface portion of the cylinder. The cylinder was submerged into the molten bath for a period of one hour thereby converting a surface portion of the cylinder to an ion-insulating material of strontium substituted beta-alumina. The penetration depth of the strontium divalent ion was calculated to be $70 \times 10^{-4}$ cm. This method and the resulting composite body were made in accordance with my invention.

EXAMPLE II

A solid ion-conductive electrolyte material of sodium beta-alumina was provided. A bath composition of $Ca(NO_3)_2 \cdot NaNO_3$ was in molten condition at a temperature of 500° C. The molten bath contained a divalent substitution ion of $Ca^{2+}$ which ion was to be exchanged into the surface portion of the cylinder. The cylinder was submerged into the molten bath for a period of one hour thereby converting a surface portion of the cylinder to an ion-insulating material of calcium substituted beta-alumina. The penetration depth of the calcium divalent ion was calculated to be $160 \times 10^{-4}$ cm. This method and the resulting composite body were made in accordance with my invention.

EXAMPLE III

A composite body is formed as in Example I, except that the sodium beta-alumina is in the form of a disc which is initially machined to provide a central aperture therethrough.

EXAMPLE IV

A composite body is formed as in Example I, except that the resulting composite body in the form of a disc is machined to provide a central aperture therethrough.

EXAMPLE V

A composite body of the type of Example III is provided which is in a flange or ring configuration. A pair of moderately deformable metallic elements of aluminum are provided in the form of casings having opposite open ends and a flange portion at one end of each casing. The flange portions of the casings are positioned against opposite major surfaces of the composite body. Each aluminum casing provides an anode, while graphite paint applied to the composite body provides a cathode. The assembly of the composite body and the aluminum casings is heated in a furnace at a temperature of 500° C. A power source in the form of a battery is provided for each cathode and anode pair. The negative lead of the battery is attached to the cathode, while the positive lead is attached to the anode. An electric potential is applied across each aluminum casing and the composite body at the same time to thereby pass a finite current of low amperage through the adjacent metallic elements and the composite body. Effective bonding between the metallic casings and the sodium beta-alumina electrolyte element is accomplished by a current density of one milliampere per square centimeter for a period of one hour.

EXAMPLE VI

The method of Example I is repeated except that each of the two aluminum casings are separately bonded to the opposite major surfaces of the composite body.

EXAMPLE VII

The method of Example V is repeated except that only one aluminum casing is bonded to a single major surface of the composite body.

EXAMPLE VIII

A composite body of the type of Example III is provided which is in a flange or ring configuration. A pair of moderately deformable metallic elements of aluminum are provided in the form of aluminum foils. The foils are positioned against opposite major surfaces of the composite body. Each foil provides an anode, while graphite paint applied to the sodium beta-alumina electrolyte provides a cathode. The assembly of the composite body and the aluminum foils is heated in a furnace at a temperature of 525° C. A power source in the form of a battery is provided for each cathode and anode pair. The negative lead of the battery is attached to the cathode, while the positive lead is attached to the anode. An electric potential is applied across each foil and the sodium beta-alumina electrolyte at the same time to thereby pass a finite current of low amperage through the adjacent metallic and sodium beta-alumina electrolyte elements. Effective bonding between the foils and the composite body is accomplished by applying a current density of one milliampere per square centimeter for a period of one hour.

EXAMPLE IX

The method of Example VIII is repeated except that each of the two aluminum foils is separately bonded to the opposite major surfaces of the composite body, and the temperature employed is 100° C.

EXAMPLE X

The method of Example VIII is repeated except that only one aluminum foil is bonded to a single major surface of the composite body, and the temperature employed is 25° C.

EXAMPLE XI

A composite body of the type of Example III is provided which is in a flange or ring configuration. A pair of moderately deformable metallic elements of aluminum are provided. One element is in the form of a casing having opposite open ends and a flange portion at one end. The other element is an aluminum foil. The flange portion of the casing is positioned against one major surface of the composite body while the aluminum foil is positioned against the opposite major surface. Each aluminum element provides an anode, while graphite paint applied to the sodium beta-alumina electrolyte provides a cathode. The assembly of the composite body and the aluminum elements is heated in a furnace at a temperature of 500° C. A power source in the form of a battery is provided for each cathode and anode pair. The negative lead of the battery is attached to the cathode, while the positive lead is attached to the anode. An electric potential is applied across each aluminum element and the sodium beta-alumina electrolyte from the power source at the same time to thereby pass a finite current of low amperage through the adjacent metallic and sodium beta-alumina electrolyte elements. Effective bonding between the metallic elements and the composite body is accomplished by a current density of one milliampere per square centimeter for a period of one hour at ambient temperature.

EXAMPLE XII

The method of Example XI is repeated except that each of the two aluminum elements is separately bonded to the opposite major surfaces of the composite body.

While other modifications of the invention and variations thereof which may be employed within the scope of the invention have not been described, the invention is intended to include such as may be embraced within the following claims.

What I claim as new and desire to secure by Letters Patent of the United States is:

1. A solid electrolyte material composite body comprising an ion-conductive portion selected from the class consisting of sodium beta-alumina, sodium beta"-alumina, potassium beta-alumina, potassium beta"-alumina, lithium beta-alumina, lithium beta"-alumina, hydronium beta-alumina, and hydronium beta"-alumina; an ion-insulating surface portion of a divalent ion substituted beta-alumina, and both portions having the same mechanical and physical properties.

2. A composite body as in claim 1, in which the body has at least one aperture therethrough.

3. A composite body as in claim 1, in which the ion-conductive electrolyte portion is sodium beta-alumina, and the ion-insulating surface portion is divalent ion substituted beta-alumina.

4. A method of bonding a solid electrolyte material composite body to a metallic element which comprises providing a composite body with an ion-conductive portion selected from the class consisting of sodium beta-alumina, sodium beta"-alumina, potassium beta-alumina, potassium beta"-alumina, lithium beta-alumina, lithium beta"-alumina, hydronium beta-alumina, and hydronium beta"-alumina; and an ion-insulating portion of a divalent ion substituted beta-alumina, and both portions having the same mechanical and physical properties, juxtaposing the major surfaces of at least one moderately deformable metallic element and the composite body in close surface contact, applying an electric potential across the juxtaposed elements to pass a finite current of low amperage through the juxtaposed elements to effect bonding between the juxtaposed surfaces.

5. A method as in claim 4, in which the ion-conductive portion is sodium beta-alumina, and the ion-insulating surface portion is divalent ion substituted beta-alumina.

* * * * *